Dec. 19, 1967   M. ROSSNAN   3,358,588
APPARATUS FOR SHAPING AND COOKING FOOD
Filed Oct. 7, 1965

Michael Rossnan
INVENTOR

3,358,588
APPARATUS FOR SHAPING AND COOKING FOOD
Michael Rossnan, 11724 Lovejoy St.,
Silver Spring, Md. 20902
Filed Oct. 7, 1965, Ser. No. 493,664
1 Claim. (Cl. 99—426)

ABSTRACT OF THE DISCLOSURE

The cooker here set forth is a jacketed, pocketed metal container in which the raw, minced or cooked seafood meat, such as crabs and lobsters, are molded into shape, cooked by steam, and cooled by running water into and through the jacketed part of the device.

---

My present invention relates to improvements in Apparatus for Shaping and Cooking Food, one object of the invention being the provision of an apparatus in which loose flakes or minced foods, such as crab and other sea food meats, and various other minced meats, may be shaped and cooked so that they will hold the shapes for immediate use or for canning.

Another object of the invention is the provision of a shaping heatable body member, jacketed to permit a heating vehicle to cook the product, and also to receive a cooling agent, to cool the container, combined with a removable lid, that may have a rim or be rimless.

In order that the invention may be understood and its numerous advantages appreciated, attention is invited to the accompanying drawings, in which.

Figure 1:
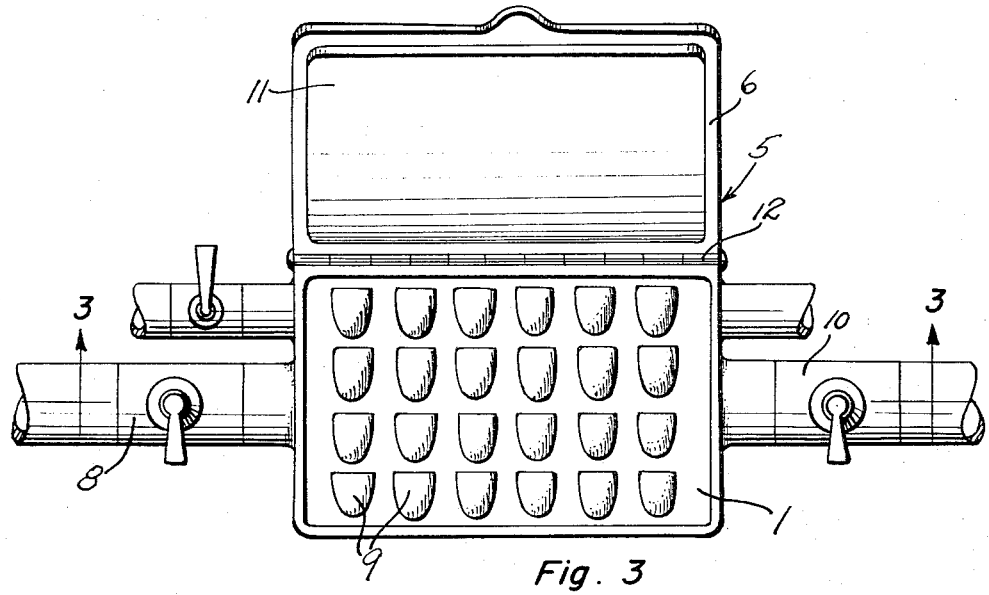
FIGURE 1 is a top plan view of the bottom member open with its cover or lid swung back, in a position to receive the food to be shaped and cooked, or to permit removal of the cooked and cooled shaped food.
Figure 3:
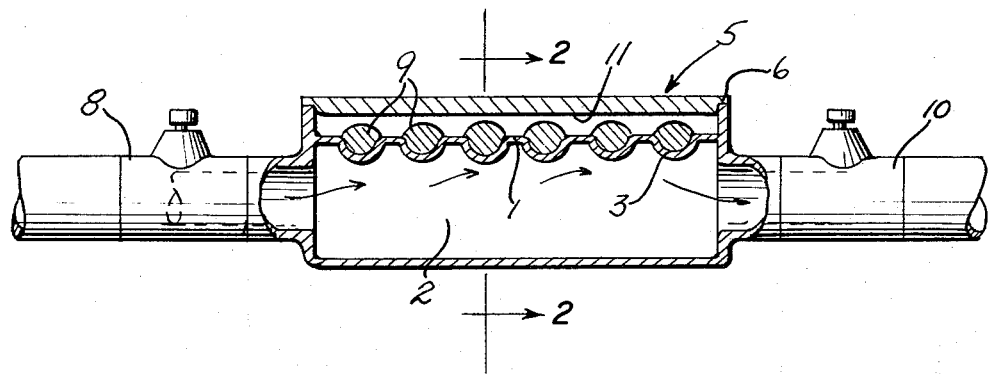
FIGURE 3 is a longitudinal section through the complete device.
Figure 2:
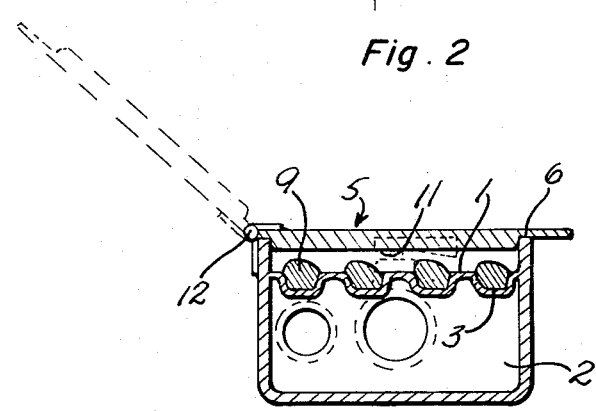
FIGURE 2 is a cross section through the complete cooker, with the lid in use, and food in several shaping and cooking pockets.

Referring to the drawings, the numeral 1, designates the main receiving member or base member, rectangular in shape and having the jacket 2, integral therewith, and provided with a plurality of open transverse rounded bottom, food shaping and receiving pockets 3, open at the top of the member. A lid 5, having a rim 6, may be swingingly attached to the main member 1.

Leading to the chamber, formed by the jacketing of the main member, is a valved conduit 13, to deliver live, superheated steam thereto, a valved outlet 8, being provided to retain the steam in the chamber for the desired time period to cook the shaped product 9, after which the steam valve is cut off and the outlet valve opened to let out the steam. The valve 10, is now opened, and the chamber is flushed with cold water to reduce the heat in the pockets and permit removal of the cooked and shaped product.

The lid having a flat inner face 11, acts as a seal tight closure for the chamber 2. This lid here shown is provided with the hinges 12, so that it may be swung up and backwardly, relative to the cooking and shaping means of this device.

The cooker here set forth is a completely jacketed pocketed metal container in which the raw, minced or cooked seafood meat, such as crabs and lobsters, are molded into shape, cooked by steam, and cooled by running water into and through the jacketed parts of the device.

What I claim as new is:

A food shaping and cooking device including an integral base jacketed rectangular member having valved inlet and outlet connections to the jacket for steam and cold water, respectively, and provided with a plurality of open transverse rounded bottom cavities open at the top of the member, and a hinged lid connected to the jacketed rectangular member adapted to seal thereagainst, whereby the food contained in the base member is shaped, cooked and cooled.

References Cited
UNITED STATES PATENTS

| | | | |
|---|---|---|---|
| 317,064 | 5/1885 | Wittenstrom | 249—79 |
| 1,323,028 | 11/1919 | Demuth | 99—349 X |
| 2,086,477 | 7/1937 | Restel | 99—384 |
| 3,124,627 | 3/1964 | Hood | 249—79 X |
| 3,233,562 | 2/1966 | Nakamura | 107—54 |

WALTER A. SCHEEL, *Primary Examiner.*

A. O. HENDERSON, *Assistant Examiner.*